US012641527B2

(12) United States Patent
Akl et al.

(10) Patent No.: US 12,641,527 B2
(45) Date of Patent: May 26, 2026

(54) TECHNIQUES FOR MITIGATING PHYSICAL CELL IDENTIFIER CONFLICTS

(71) Applicant: QUALCOMM Incorporated, San Diego, CA (US)

(72) Inventors: Naeem Akl, Bridgewater, NJ (US); Karl Georg Hampel, Jersey City, NJ (US); Navid Abedini, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 18/489,176

(22) Filed: Oct. 18, 2023

(65) Prior Publication Data

US 2025/0133483 A1 Apr. 24, 2025

(51) Int. Cl.
*H04W 48/16* (2009.01)
(52) U.S. Cl.
CPC .................................. *H04W 48/16* (2013.01)
(58) Field of Classification Search
CPC .............................. H04W 48/16; H04W 48/08

USPC ......................................................... 455/434
See application file for complete search history.

(56) References Cited

U.S. PATENT DOCUMENTS

| | | | |
|---|---|---|---|
| 2020/0196332 A1* | 6/2020 | Yokomakura ..... | H04W 72/0453 |
| 2022/0279619 A1* | 9/2022 | Wu ..................... | H04W 12/106 |
| 2023/0037605 A1* | 2/2023 | Koskela ................ | H04L 5/0094 |
| 2024/0349357 A1* | 10/2024 | Park .................. | H04W 74/0833 |

* cited by examiner

*Primary Examiner* — Qutbuddin Ghulamali
(74) *Attorney, Agent, or Firm* — Holland & Hart LLP

(57) ABSTRACT

Methods, systems, and devices for wireless communication are described. A user equipment (UE) may receive, via a cell with a physical cell identity, first signaling that indicates a first physical cell identifier (PCI) value of a PCI sequence and a code value associated with the PCI sequence for the cell. The UE may receive, via the cell with the physical cell identity, second signaling that indicates a second PCI value of the PCI sequence and the code value associated with the PCI sequence for the cell. The UE may perform, via the cell with the physical cell identity, one or more wireless communications in association with determining the physical cell identity of the cell based on the code value and the PCI sequence comprising the first PCI value and the second PCI value (which may be a function of the first PCI value and the code value).

30 Claims, 14 Drawing Sheets

105-d 115-a

405 First Signaling

410 Extract First PCI and First Code Value

415 Second Signaling

420 Extract Second PCI and Second Code Value

425 Determine Unique Cell Identity

430 Measurement Report

400

910            920            915

905

900

Communications Manager

First Signaling Component

1025

Receiver

1010

Second Signaling Component

1030

Transmitter

1015

Physical Cell Component

1035

1020

1005

1000

130 105 115

Network Entity

Transceiver

1210

Antenna

1215

Communications Manager

1220

Memory

Code

1230

1225

1240

Processor

1235

1205

1200

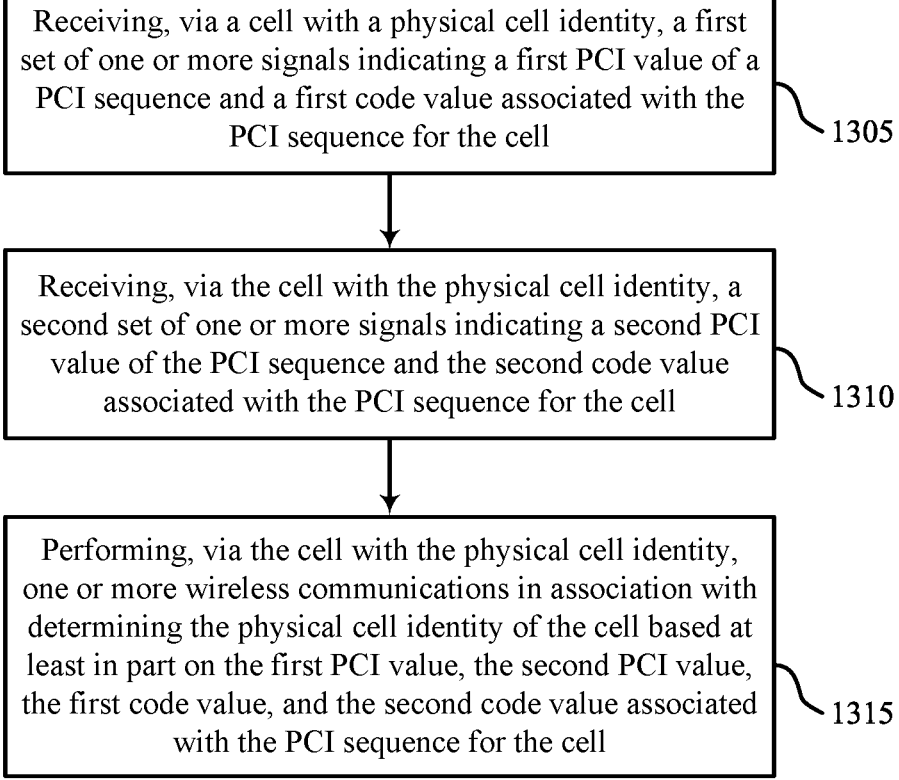

Receiving, via a cell with a physical cell identity, a first set of one or more signals indicating a first PCI value of a PCI sequence and a first code value associated with the PCI sequence for the cell ⟋1305

Receiving, via the cell with the physical cell identity, a second set of one or more signals indicating a second PCI value of the PCI sequence and the second code value associated with the PCI sequence for the cell ⟋1310

Performing, via the cell with the physical cell identity, one or more wireless communications in association with determining the physical cell identity of the cell based at least in part on the first PCI value, the second PCI value, the first code value, and the second code value associated with the PCI sequence for the cell ⟋1315

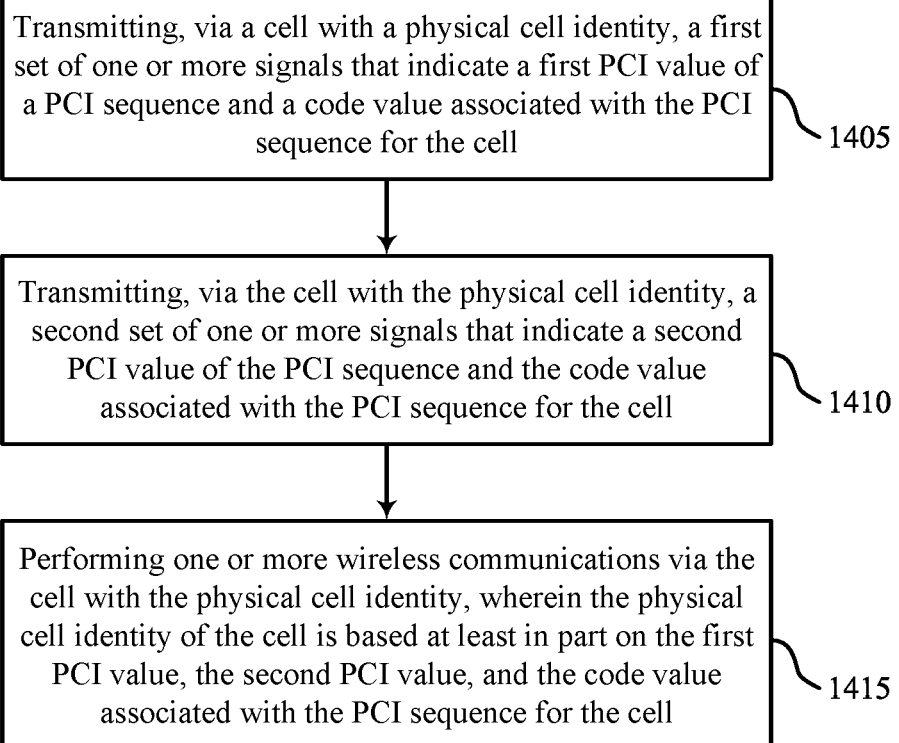

Transmitting, via a cell with a physical cell identity, a first set of one or more signals that indicate a first PCI value of a PCI sequence and a code value associated with the PCI sequence for the cell

1405

Transmitting, via the cell with the physical cell identity, a second set of one or more signals that indicate a second PCI value of the PCI sequence and the code value associated with the PCI sequence for the cell

1410

Performing one or more wireless communications via the cell with the physical cell identity, wherein the physical cell identity of the cell is based at least in part on the first PCI value, the second PCI value, and the code value associated with the PCI sequence for the cell

TECHNIQUES FOR MITIGATING PHYSICAL CELL IDENTIFIER CONFLICTS

FIELD OF TECHNOLOGY

The following relates to wireless communication, including techniques for mitigating physical cell identifier (PCI) conflicts.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A UE may distinguish one cell from another based on their respective physical cell identifiers (PCIs). In some cases, however, if two neighbor cells share the same PCI, the UE may experience setup failures, dropped calls, handover issues, and/or channel interference, and the like.

SUMMARY

Aspects of the present disclosure relate to improved methods, systems, devices, and apparatuses that support techniques for mitigating physical cell identifier (PCI) conflicts. In accordance with the techniques described herein, a user equipment (UE) may determine the physical identity of a cell based on a sequence of PCI values that depends on a code value. For example, the UE may receive first signaling that indicates a first PCI value of the sequence and the code value. The UE may receive second signaling that indicates a second PCI value of the sequence and the code value. Accordingly, the UE may determine the physical identity of the cell based on the first PCI value, the second PCI value, and the associated code value.

A method for wireless communication by a UE is described. The method may include: receiving, via a cell with a physical cell identity, a first set of one or more signals indicating a first PCI value of a PCI sequence and a code value associated with the PCI sequence for the cell; receiving, via the cell with the physical cell identity, a second set of one or more signals indicating a second PCI value of the PCI sequence and the code value associated with the PCI sequence for the cell; and performing, via the cell with the physical cell identity, one or more wireless communications in association with determining the physical cell identity of the cell based on the first PCI value, the second PCI value, and the code value associated with the PCI sequence for the cell.

A method for wireless communication by a network entity is described. The method may include: transmitting, via a cell with a physical cell identity, a first set of one or more signals that indicate a first PCI value of a PCI sequence and a code value associated with the PCI sequence for the cell; transmitting, via the cell with the physical cell identity, a second set of one or more signals that indicate a second PCI value of the PCI sequence and the code value associated with the PCI sequence for the cell; and performing one or more wireless communications via the cell with the physical cell identity, where the physical cell identity of the cell is based on the first PCI value, the second PCI value, and the code value associated with the PCI sequence for the cell.

A UE is described. The UE may include one or more memories storing processor-executable code, and one or more processors coupled with the one or more memories. The one or more processors may be individually or collectively operable to execute the code to cause the UE to: receive, via a cell with a physical cell identity, a first set of one or more signals indicating a first PCI value of a PCI sequence and a code value associated with the PCI sequence for the cell; receive, via the cell with the physical cell identity, a second set of one or more signals indicating a second PCI value of the PCI sequence and the code value associated with the PCI sequence for the cell; and perform, via the cell with the physical cell identity, one or more wireless communications in association with determining the physical cell identity of the cell based on the first PCI value, the second PCI value, and the code value associated with the PCI sequence for the cell.

A network entity is described. The network entity may include one or more memories storing processor-executable code, and one or more processors coupled with the one or more memories. The one or more processors may be individually or collectively operable to execute the code to cause the network entity to: transmit, via a cell with a physical cell identity, a first set of one or more signals that indicate a first PCI value of a PCI sequence and a code value associated with the PCI sequence for the cell; transmit, via the cell with the physical cell identity, a second set of one or more signals that indicate a second PCI value of the PCI sequence and the code value associated with the PCI sequence for the cell; and perform one or more wireless communications via the cell with the physical cell identity, where the physical cell identity of the cell is based on the first PCI value, the second PCI value, and the code value associated with the PCI sequence for the cell.

In some of the examples described herein, the second PCI value is a function of the first PCI value, and the code value associated with the PCI sequence for the cell.

In some of the examples described herein, the function includes at least one of a constant function, a linear ramp function that iterates through all PCI values of a set of PCI values, a linear ramp function that iterates through a subset of the set of PCI values, or an alternating function.

In some of the examples described herein, the first PCI value is equivalent to the second PCI value.

In some of the examples described herein, the UE may determine the physical cell identity of the cell based on the PCI sequence including the first PCI value and the second PCI value, where the PCI sequence is based on the code value associated with the PCI sequence for the cell and a coefficient.

In some of the examples described herein, the UE may receive: a primary synchronization signal (PSS) and a secondary synchronization signal (SSS) that collectively indicate the first PCI value or the second PCI value; and a master information block (MIB) or a system information block (SIB) that indicates the code value associated with the PCI sequence for the cell.

In some of the examples described herein, a first value encoded by the PSS and a second value encoded by the SSS follow a sequence that depends on the code value associated with the PCI sequence for the cell.

In some of the examples described herein, a first value encoded by the PSS is fixed and a second value of the SSS follows a sequence that depends on the code value associated with the PCI sequence for the cell.

In some of the examples described herein, the MIB is scrambled using the first PCI value or the second PCI value.

In some of the examples described herein, the UE may receive at least one demodulation reference signal (DMRS) that is scrambled using the first PCI value, the second PCI value, the code value associated with the PCI sequence for the cell, or any combination thereof.

In some of the examples described herein, the UE may transmit a report that includes one or more measurements of the first PCI value, the second PCI value, or both.

In some of the examples described herein, the one or more measurements correspond to the PCI sequence associated with the physical cell identity of the cell.

In some of the examples described herein, the report further indicates timing information associated with the one or more measurements of the first PCI value or the second PCI value.

In some of the examples described herein, the report further indicates the code value associated with the PCI sequence for the cell.

In some of the examples described herein, the UE may: receive a third set of one or more signals indicating the first PCI value and a second code value; and determine that the third set of one or more signals correspond to another cell based on the second code value being different from the code value associated with the PCI sequence for the cell.

In some of the examples described herein, the network entity may transmit: a PSS and an SSS that collectively indicate the first PCI value or the second PCI value; and a MIB or a SIB that indicates the code value associated with the PCI sequence for the cell.

In some examples described herein, the network entity may scramble at least one DMRS using the first PCI value, the second PCI value, the code value associated with the PCI sequence for the cell, or any combination thereof.

In some examples described herein, the network entity may change the first PCI value of the cell to the second PCI value after a quantity of synchronization signal block (SSB) bursts.

In some examples described herein, the network entity may receive a report that includes one or more measurements of the first PCI value, the second PCI value, or both.

BRIEF DESCRIPTION OF THE DRAWINGS

FIGS. 13 and 14 show flowcharts illustrating methods that support techniques for mitigating PCI conflicts in accordance with one or more aspects of the present disclosure.

DETAILED DESCRIPTION

Figure 1:
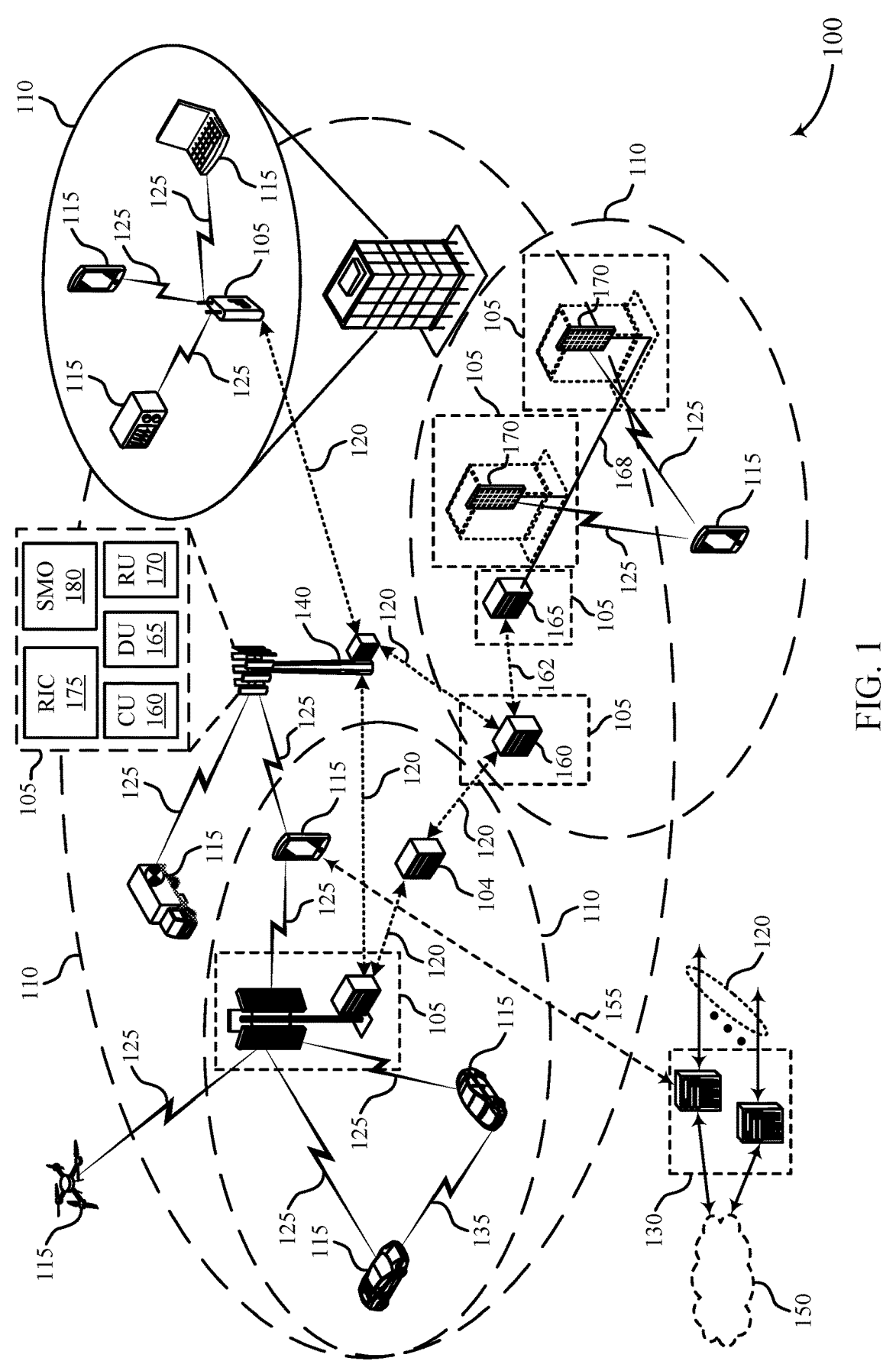
FIGS. 1 through 3 show examples of wireless communications systems that support techniques for mitigating physical cell identifier (PCI) conflicts in accordance with one or more aspects of the present disclosure.

In some wireless communication systems, a user equipment (UE) may communicate with a network entity via one or more cells. As described herein, a cell may be defined by a frequency (such as a carrier frequency of the network entity) and a coverage area (such as a geographic zone served by the network entity). Each cell of the network entity may have a corresponding physical cell identifier (PCI) value between 0 and 1008. The network entity may advertise (e.g., signal, indicate) the PCI value of a particular cell via a synchronization signal block (SSB). More specifically, the UE may determine the PCI value of the cell based on a first value encoded by a primary synchronization signal (PSS) of the SSB and a second value encoded by a secondary synchronization signal (SSS) of the SSB.

The PCI value indicated by the SSB may enable the UE to distinguish the cell from other cells in the same frequency and/or coverage area. In some cases, however, if two cells share the same PCI (referred to as a PCI conflict), the UE may experience setup failures, dropped calls, handover issues, channel interference, etc. PCI conflicts can include PCI confusion (where two neighbor cells have the same PCI value) or PCI collision (where a serving cell and a neighbor cell have the same PCI value). PCI conflicts may occur more frequently in denser cell deployments, mobile networks, and aerial UE systems, among other examples. In some cases, network planning can reduce or minimize the prevalence of PCI conflicts. However, such approaches may be fairly time-consuming, and PCI conflicts that do occur may persist for a relatively long time.

In accordance with aspects of the present disclosure, each cell of a network entity may be identified by a time-variant sequence of PCI values, rather than a single PCI value. The sequence of PCI values may depend on a code value that is linked to (e.g., associated with) the physical identity of the cell. For example, a UE may receive first signaling that indicates a first PCI value of a PCI sequence and a first code value associated with a particular cell. Subsequently, the UE may receive second signaling that indicates a second PCI value of the PCI sequence and a second code value associated with the cell. The UE may determine the physical identity of the cell based on the PCI sequence (which includes the first PCI value and the second PCI value), the first code value, and the second code value (which may be the same or different from the first code value).

In some implementations, the second PCI value may be a function of the first PCI value and the code value associated with the cell. For example, the network entity associated with the cell may determine the second PCI value based on a function (such as a constant function, a linear ramp function, an alternating function, or the like) that depends on the first PCI value and the code value. In some examples, the network entity may indicate the code value associated with the physical identity of the cell via system information, such as a master information block (MIB) or a system information block (SIB). The UE may extract the code value from the system information and use the code value, the first PCI value, and the second PCI value to differentiate the cell from other cells in the same frequency and/or coverage area, including those with the same PCI value.

Aspects of the disclosure are initially described in the context of wireless communications systems and process flows. Aspects of the disclosure are further illustrated by and described with reference to apparatus diagrams, system diagrams, and flowcharts that relate to techniques for mitigating PCI conflicts.

FIG. 1 shows an example of a wireless communications system 100 that supports techniques for mitigating PCI conflicts in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115.

In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations).

In some examples, one or more network entities 105 of a disaggregated RAN architecture may be implemented as virtual units (e.g., a virtual CU (VCU), a virtual DU (VDU), a virtual RU (VRU)). The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)).

The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170).

A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor.

An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for mitigating PCI conflicts as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation.

A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115.

For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a PCI, a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In accordance with the techniques described herein, a UE 115 may determine the physical identity of a cell (such as a cell of a network entity 105) based on a sequence of PCI values that depends on a code value. For example, the UE 115 may receive first signaling that indicates a first PCI value of the sequence and the code value. The UE 115 may receive second signaling that indicates a second PCI value of the sequence and the code value. Accordingly, the UE 115 may determine the physical identity of the cell based on the first PCI value, the second PCI value, and the associated code value. Using a sequence of PCI values to uniquely identify physical cells may reduce PCI conflicts and improve the reliability of communications between the UE 115 and other devices in the wireless communications system 100.

Figure 2:
Figure 2:
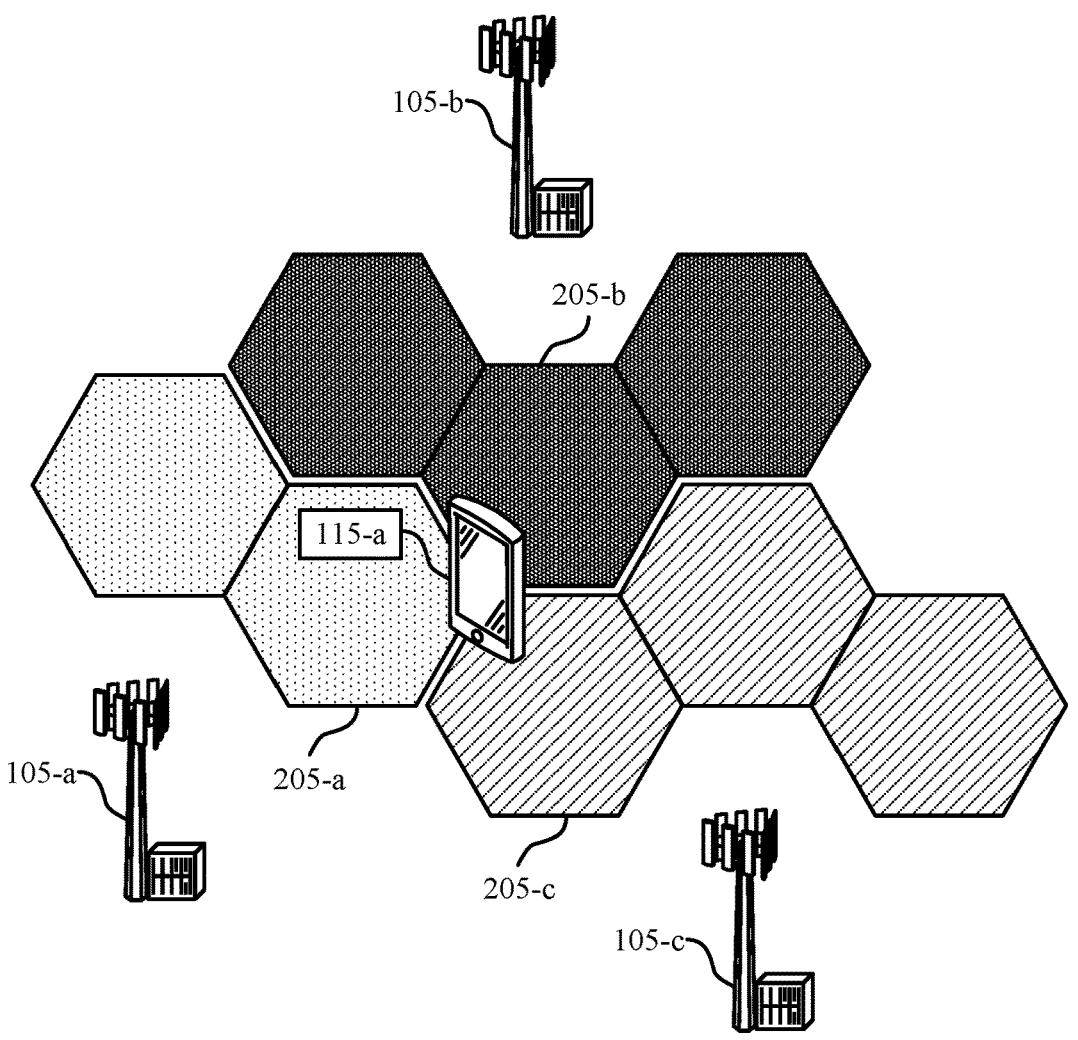

FIG. 2 shows an example of a wireless communications system 200 that supports techniques for mitigating PCI conflicts in accordance with one or more aspects of the present disclosure. The wireless communications system 200 may implement one or more aspects of the wireless communications system 100. For example, the wireless communications system 200 includes a UE 115-a, a network entity 105-a (e.g., Network Entity A), a network entity 105-b (e.g., Network Entity B), and a network entity 105-c (e.g., Network Entity C), which may be examples of corresponding devices shown and described with reference to FIG. 1. As depicted in the example of FIG. 2, the UE 115-a may communicate with the network entity 105-a, the network entity 105-b, and the network entity 105-c via a cell 205-a, a cell 205-b, and a cell 205-c, respectively.

As described herein, a cell may be defined by a frequency (such as a carrier frequency of a network entity 105) and a coverage area (such as a geographic zone served by the network entity 105). Each cell of a network entity 105 may have a corresponding PCI value between 0 and 1008. The network entity 105 may advertise (e.g., signal, indicate) the PCI value of a particular cell via an SSB. In particular, the UE 115-a may jointly (e.g., collectively) determine the PCI value of the cell based on a first value encoded by a PSS of the SSB and a second value encoded by a SSS of the SSB. The PCI value of a cell may be used for various purposes, including (but not limited to) cell search, cell selection, scrambling/descrambling, measurement reporting, etc.

The PCI value provided by the network entity 105 may enable the UE 115-a to distinguish a particular cell from other cells in the same frequency and/or coverage area. In some cases, however, if two cells share the same PCI (referred to as a PCI conflict), the UE 115-a may experience setup failures, dropped calls, handover issues, channel interference, etc. PCI conflicts can include PCI confusion (where two neighbor cells have the same PCI value) or PCI collision (where a serving cell and a neighbor cell have the same PCI value). As an example, PCI confusion may occur if the UE 115-a is being served by the cell 205-a, and two neighboring cells (such as the cell 205-b and the cell 205-c) have the same PCI value. PCI collision may occur if the serving cell of the UE 115-a (such as the cell 205-a) and a neighboring cell (such as the cell 205-b or the cell 205-c) share the same PCI value. In some cases, network planning can help mitigate PCI conflicts. However, such approaches may be somewhat resource-intensive, and PCI conflicts that do occur may persist for a relatively long time.

In accordance with aspects of the present disclosure, each cell of a network entity 105 may be identified by a time-variant sequence of PCI values, rather than a single PCI value. The sequence of PCI values may depend on a code value that is linked to (e.g., associated with) the physical identity of the cell. As an example, the UE 115-a may receive first signaling that indicates a first PCI value of a PCI sequence and a code value associated with the cell 205-a. Subsequently, the UE 115-a may receive second signaling that indicates a second PCI value of the PCI sequence and the code value associated with the cell 205-a. The UE 115-a may determine the physical identity of the cell 205-a based on the PCI sequence (which includes the first PCI value and the second PCI value) and the code value.

In some implementations, the second PCI value may be a function of the first PCI value and the code value associated with the cell 205-a. For example, the network entity 105-a associated with the cell 205-a may determine the second PCI value based on a function (such as a constant function, a linear ramp function, an alternating function, or the like) that depends on the first PCI value and the code value. In some examples, the network entity 105-a may indicate the code value associated with the physical identity of the cell 205-a via system information, such as a MIB or a SIB. The UE 115-a may extract the code value from the system information and use the code value, the first PCI value, and the second PCI value to differentiate the cell 205-a from other cells in the same frequency and/or coverage area, including those with the same PCI value.

Figure 3:
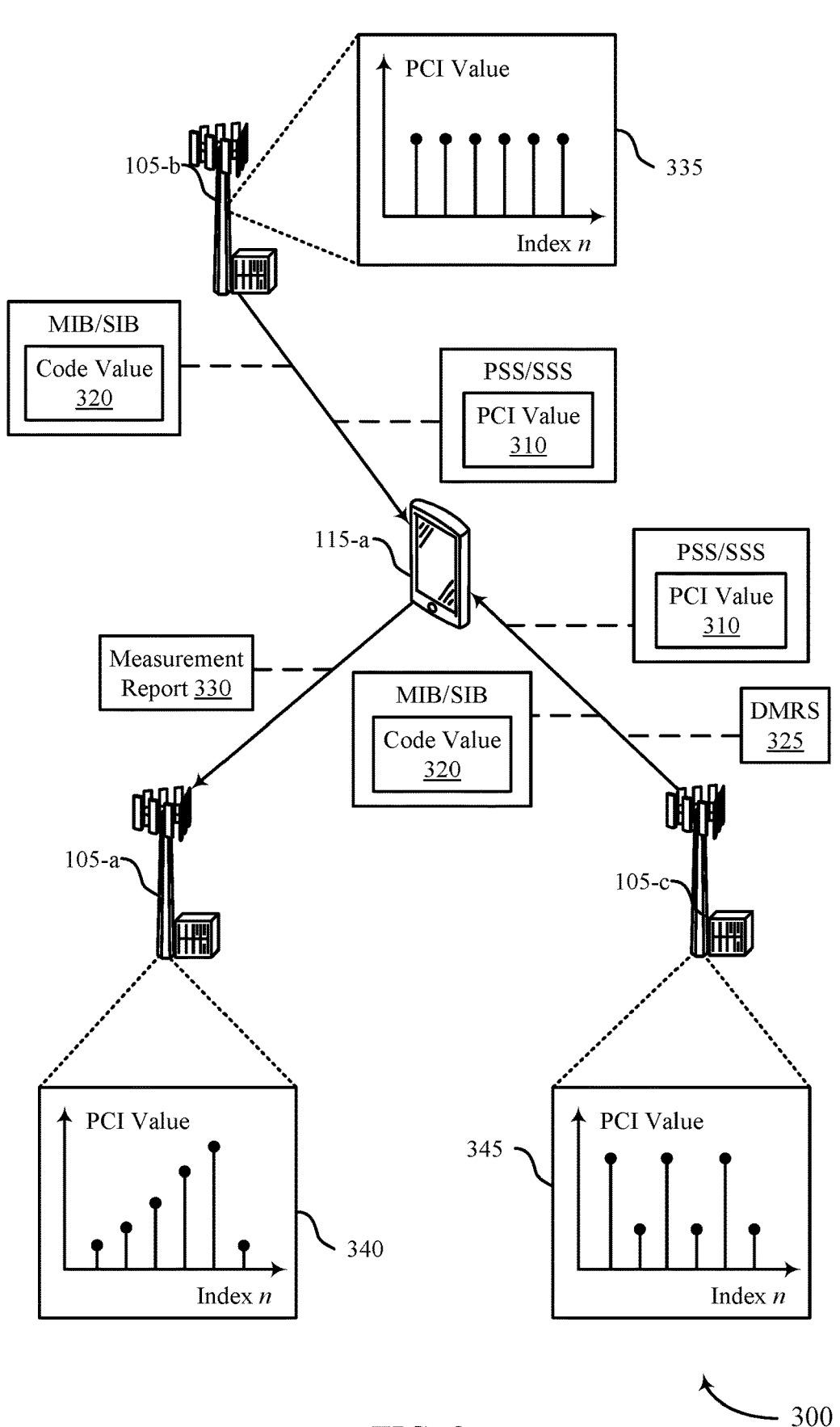

FIG. 3 shows an example of a wireless communications system 300 that supports techniques for mitigating PCI conflicts in accordance with one or more aspects of the present disclosure. The wireless communications system 300 may implement one or more aspects of the wireless communications system 100 or the wireless communications system 200. For example, the wireless communications system 300 includes a UE 115-a, a network entity 105-a, a network entity 105-b, and a network entity 105-c, which may be examples of corresponding elements shown and described with reference to FIGS. 1 and 2. As depicted in the example of FIG. 3, the UE 115-*a* may communicate with the network entities 105 via one or more cells, such as the cell 205-*a* shown and described with reference to FIG. 2.

As described herein, PCI conflicts can arise in wireless communications systems that support 4G and 5G communications. Since the number of cells may be much larger than the PCI range (which is 1008 for 5G), PCI values 310 may be re-used across multiple cells. PCI conflicts occur when the UE 115-*a* is unable to distinguish between two cells with the same PCI value 310 and frequency. PCI confusion occurs when two neighbor cells have a PCI conflict. PCI collision occurs when there is a PCI conflict between a serving cell and a neighbor cell. PCI conflicts can lead to call setup failures, dropped calls, failed handovers, channel interference, and the like. In some cases, PCI conflicts can be minimized via network planning. PCI conflicts may occur more frequently in dense deployments, mobile-node networks, aerial UE systems, etc.

Some wireless communications systems (such as 5G systems) may rely on network planning to avoid PCI conflicts. In these systems, PCI conflicts that do occur may persist for some time, and the UE 115-*a* may experience radio link failure (RLF) when PCI conflicts arise. Other wireless communications systems (such as 6G systems) that support densification of networks via relays, subscriber-based infrastructure, and/or moving infrastructure may selectively utilize network planning for minimum umbrella coverage. By doing so, PCI conflicts that do occur may persist for a relatively short time duration (e.g., 20 ms), and short-term PCI collisions may be unlikely to cause RLF for the UE 115-*a*, since the communications do not fully depend on the PCI value.

In accordance with one or more aspects of the innovative subject matter described in this disclosure, the PCI value 310 of a cell may follow a coded sequence, such that each cell is identified by a sequence of PCI values 310 (rather than a single PCI value 310). The next PCI value 310 in the sequence may be a function of the current PCI value 310 and a code value 320. For example, if the code value 320 is x and the current PCI value 310 of the cell is PCI1, the next PCI value 310 of the cell may be represented as PCI2=f (PCI1, x), and the following PCI value 310 of the cell may be represented as PCI3=f (PCI2, x). The code value 320 may be carried in (e.g., provided via) system information, such as a MIB or SIB.

Various types of PCI sequences are contemplated within the scope of the present disclosure. In some implementations, a PCI sequence may be represented as $PCI_{(n+1)}=[PCI_{(n)}+i*(code\ value)]\ mod(1008)$, where i is an integer coefficient (e.g., 0, 1, . . . ). When i=0, the PCI sequence of the cell may follow a constant function 335. In other words, PCI1=PCI2=PCI3. If the PCI space of the system is as large as 5G (e.g., 1008), there can be 1008 possible PCI sequences. When i=1, the PCI sequence may follow a linear ramp function 340 that iterates through all PCI values 310. As a result, there may be one possible PCI sequence. When i=2, the PCI sequence may follow a linear ramp function that iterates through every other PCI value 310 (or a subset of PCI values 310). In such implementations, there may be two possible PCI sequences (for example, even PCI values 310 and odd PCI values 310). Alternatively, the PCI sequence may follow an alternating function 345, such that $PCI_{(n)}$=PCI1 if n is odd and $PCI_{(n)}$=PCI2 if n is even, etc.

The PCI sequences described herein can be encoded in numerous ways. For example, both the PSS and the SSS (which collectively indicate the current PCI value 310 of the cell) may both follow the coded sequence. In such implementations, the PCI sequence may be represented as {PSS1, SSS1}, {PSS2, SSS2}, {PSS3, SSS3}, and so on. Alternatively, the value encoded by the PSS may be fixed, while the value encoded by the SSS may follow the coded sequence. In such implementations, the PCI sequence may be represented as {PSS1, SSS1}, {PSS1, SSS2}, {PSS1, SSS3}, and soon. Keeping the PSS fixed may enable blind combining of samples for PSS detection (independent of the PSS value), and downlink synchronization may be independent of PCI changes. However, having a fixed PSS may reduce the number of possible PCI sequences by a factor of 3. In some implementations, a network entity 105 may change the PCI value 310 of a particular cell every N SSB bursts, where N=1, 2, 3, etc.

The techniques described herein may support various PCI-based scrambling algorithms. For example, a MIB may be scrambled using the cell's current PCI value 310, whereas a demodulation reference signal (DMRS) 325 may be scrambled using the cell's current PCI value 310, the code value associated with the cell's PCI sequence, or a combination thereof. Scrambling the DMRS 325 based on the cell's code value may help resolve/detect PCI conflicts. For example, if the PCI sequences of two neighbor cells collide (such that their current PCI values 310 are the same), scrambling the DMRS 325 may be different for each cell (assuming both cells have different code values 320), which can help reduce interference.

In some implementations, the UE 115-*a* may be configured to transmit a measurement report 330 to one or more of the network entities 105. The measurement report 330 may include measurements of PCI values 310, measurements of a sequence of PCI values for a given cell, a time associated with measurements of the PCI values 310, the code value 320 of a given cell, and the like. In some examples, the reporting behavior of the UE 115-*a* may be configurable. The techniques described with reference to FIG. 3 may reduce the number of PCI conflicts that occur within the wireless communications system 300, decrease the severity of PCI conflicts that do occur within the wireless communications system 300, and improve the reliability of communications between the UE 115-*a* and the network entities 105, among other benefits.

Figure 4:
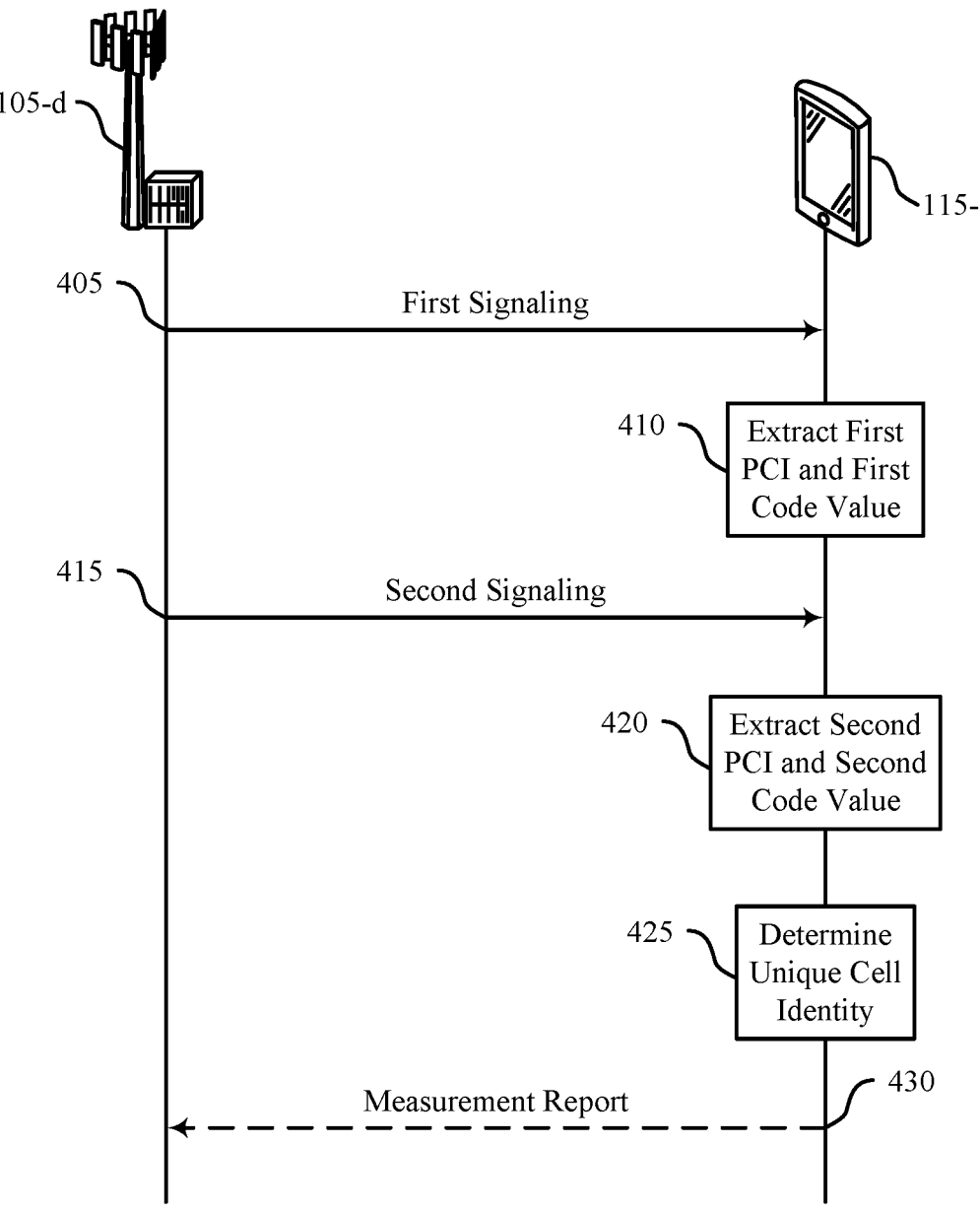
FIG. 4 shows an example of a process flow that supports techniques for mitigating PCI conflicts in accordance with one or more aspects of the present disclosure.

FIG. 4 shows an example of a process flow 400 that supports techniques for mitigating PCI conflicts in accordance with one or more aspects of the present disclosure. The process flow 400 may implement one or more aspects of the wireless communications systems shown and described with reference to FIGS. 1 through 3. For example, the process flow 400 includes a network entity 105-*d* and a UE 115-*a*, which may be examples of corresponding elements shown and described with reference to FIGS. 2 and 3. In the following description of the process flow 400, operations between the network entity 105-*d* and the UE 115-*a* may be added, omitted, or performed in a different order (with respect to the exemplary order shown).

At 405, the UE 115-*a* may receive, via a cell of the network entity 105-*d* (such as the cell 205-*a* shown and described with reference to FIG. 2), first signaling that indicates a first PCI value (such as a PCI value 310 described with reference to FIG. 3) of a PCI sequence and a code value (such as a code value 320 described with reference to FIG. 3) associated with the PCI sequence. The first signaling may include one or more of an SSB, a PSS, an SSS, a MIB, or a SIB. In some implementations, the first signaling may include a DMRS (such as a DMRS 325 described with reference to FIG. 3) that is scrambled using the first PCI value, the code value, or a combination thereof.

At 410, the UE 115-*a* may extract the first PCI value and the code value from the first signaling. For example, the UE 115-*a* may extract a first encoded value from the PSS, extract a second encoded value from the SSS, and jointly determine the first PCI value based on the first encoded value and the second encoded value. In some examples, both the first encoded value (provided by the PSS) and the second encoded value (provided by the SSS) may follow the PCI sequence. In other examples, the first encoded value may be fixed, while the second encoded value follows the PCI sequence. In some implementations, the UE 115-*a* may use the first PCI value to descramble the MIB and extract the code value associated with the PCI sequence.

At 415, the UE 115-*a* may receive second signaling via the cell of the network entity 105-*d*. The second signaling may indicate a second PCI value of the PCI sequence and the code value associated with the PCI sequence. In some implementations, the second signaling includes at least one of an SSB, a PSS, an SSS, a MIB, or a SIB. At 420, the UE 115-*a* may extract the second PCI value and the code value from the second signaling (for example, by repeating one or more of the operations of 410). In some examples, the second PCI value may depend on the first PCI value and the code value associated with the PCI sequence. For example, the network entity 105-*d* may determine the second PCI value based on a function (such as a constant function, a linear ramp function, or an alternating function) that depends on the first PCI value, the code value, and one or more coefficients/parameters.

At 425, the UE 115-*a* may determine the physical cell identity of the cell based on the first PCI value (extracted from the first signaling at 410), the second PCI value (extracted from the second signaling at 420), and the code value indicated by the first signaling and the second signaling. In some examples, the UE 115-*a* may determine the physical cell identity of the cell by using the first PCI value, the second PCI value, and the code value to ascertain the specific function associated with the PCI sequence. Knowing the code/sequence function and the current PCI value of the cell may enable the UE 115-*a* to predict or otherwise determine the next PCI value of the cell, which may improve the efficiency and reliability of cell search, selection, and/or monitoring operations performed by the UE 115-*a*.

At 430, the UE 115-*a* may perform wireless communications with the network entity 105-*d* based on determining the physical cell identity of the cell at 425. For example, the UE 115-*a* may transmit a measurement report (such as the measurement report 330 shown and described with reference to FIG. 3) to the network entity 105-*d*. The measurement report may indicate one or more measurements of the first PCI value, one or more measurements of the second PCI value, one or more measurements associated with the PCI sequence (containing the first PCI value and the second PCI value), timing information associated with measurements of the first PCI value and/or the second PCI value, an indication of the code value associated with the cell, etc.

Figure 5:
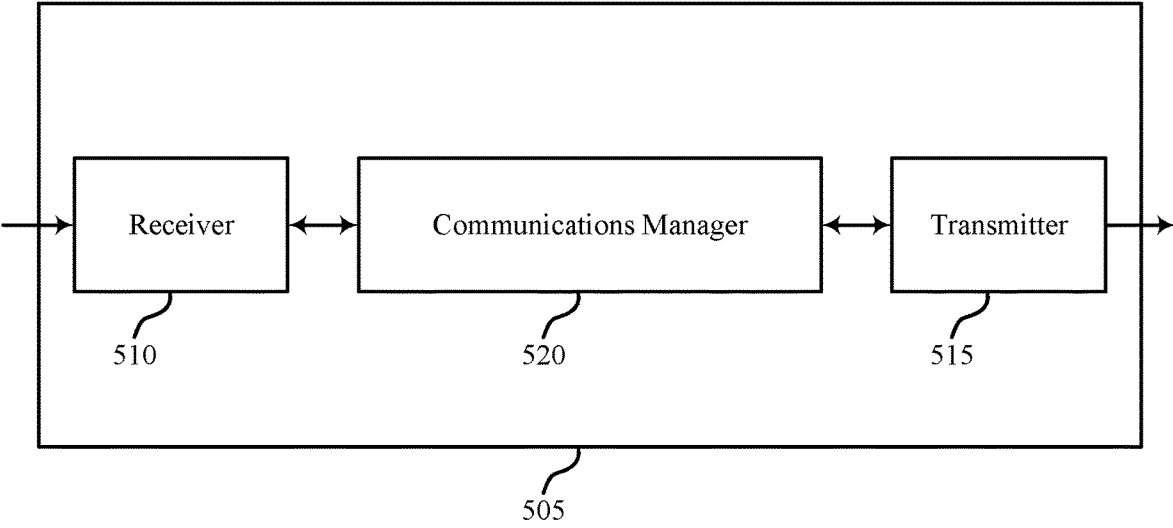
FIGS. 5 and 6 show block diagrams of devices that support techniques for mitigating PCI conflicts in accordance with one or more aspects of the present disclosure.

FIG. 5 shows a block diagram 500 of a device 505 that supports techniques for mitigating PCI conflicts in accordance with one or more aspects of the present disclosure. The device 505 may be an example of aspects of a UE 115, as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for mitigating PCI conflicts). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for mitigating PCI conflicts). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for mitigating PCI conflicts as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may be capable of, configured to, or operable to support a means for receiving, via a cell with a physical cell identity, a first set of one or more signals indicating a first PCI value of a PCI sequence and a code value associated with the PCI sequence for the cell. The communications manager 520 may be capable of, configured to, or operable to support a means for receiving, via the cell with the physical cell identity, a second set of one or more signals indicating a second PCI value of the PCI sequence and the code value associated with the PCI sequence for the cell. The communications manager 520 may be capable of, configured to, or operable to support a means for performing, via the cell with the physical cell identity, one or more wireless communications in association with determining the physical cell identity of the cell based on the first PCI value, the second PCI value, and the code value associated with the PCI sequence for the cell.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced power consumption, greater communication reliability, and reduced processing, among other benefits.

Figure 6:
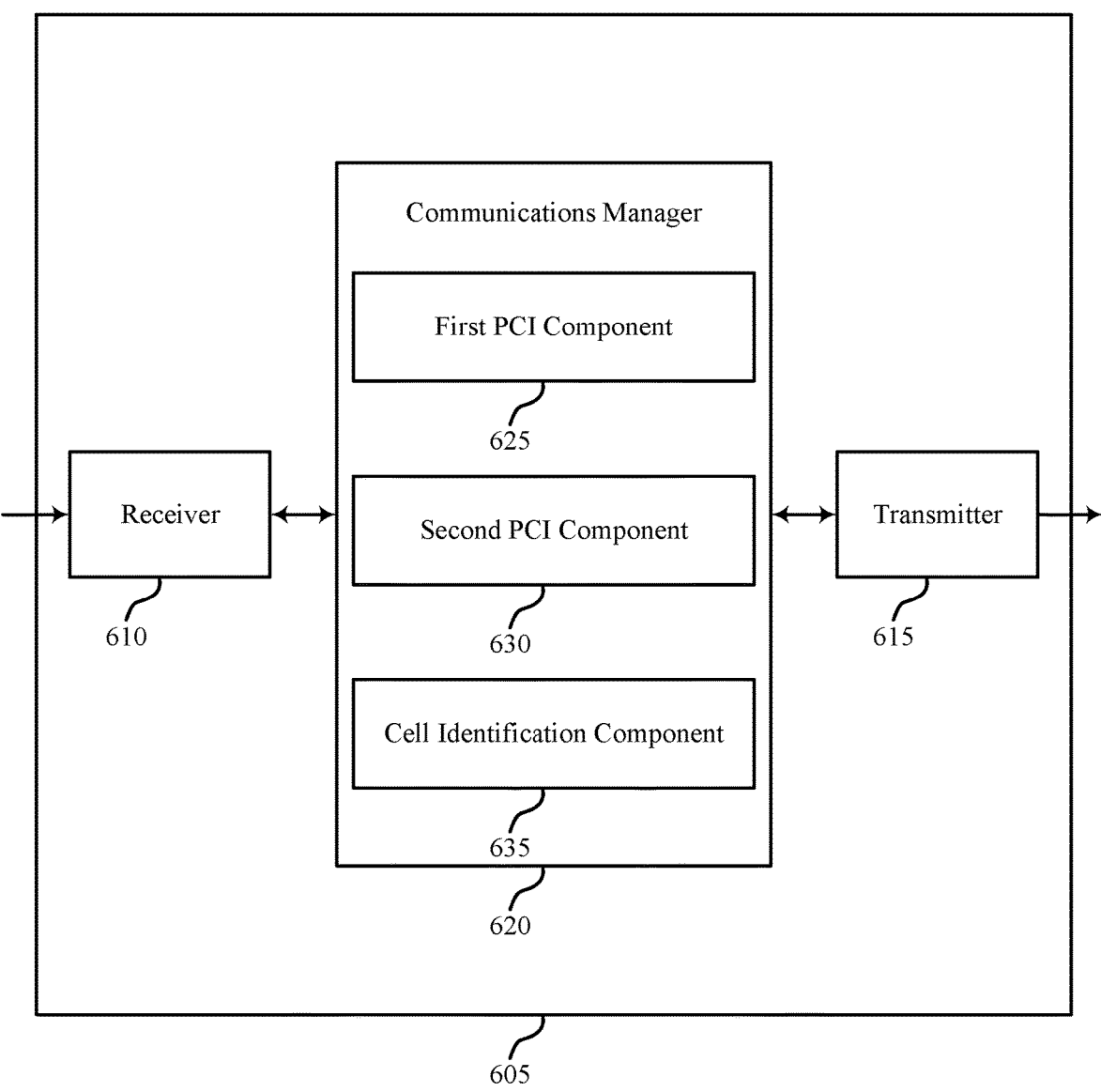

FIG. 6 shows a block diagram 600 of a device 605 that supports techniques for mitigating PCI conflicts in accordance with one or more aspects of the present disclosure. The device 605 may be an example of aspects of a device 505 or a UE 115, as described herein. The device 605 may include a receiver 610, a transmitter 615, and a communications manager 620. The device 605, or one of more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for mitigating PCI conflicts). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for mitigating PCI conflicts). In some examples, the transmitter 615 may be co-located with a receiver 610 in a transceiver module. The transmitter 615 may utilize a single antenna or a set of multiple antennas.

The device 605, or various components thereof, may support techniques for mitigating PCI conflicts, as described herein. For example, the communications manager 620 may include a first PCI component 625, a second PCI component 630, a cell identification component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support techniques for wireless communication, in accordance with examples disclosed herein. The first PCI component 625 may be capable of, configured to, or operable to support a means for receiving, via a cell with a physical cell identity, a first set of one or more signals indicating a first PCI value of a PCI sequence and a code value associated with the PCI sequence for the cell. The second PCI component 630 may be capable of, configured to, or operable to support a means for receiving, via the cell with the physical cell identity, a second set of one or more signals indicating a second PCI value of the PCI sequence and the code value associated with the PCI sequence for the cell. The cell identification component 635 may be capable of, configured to, or operable to support a means for performing, via the cell with the physical cell identity, one or more wireless communications in association with determining the physical cell identity of the cell based on the first PCI value, the second PCI value, and the code value associated with the PCI sequence for the cell.

Figure 7:
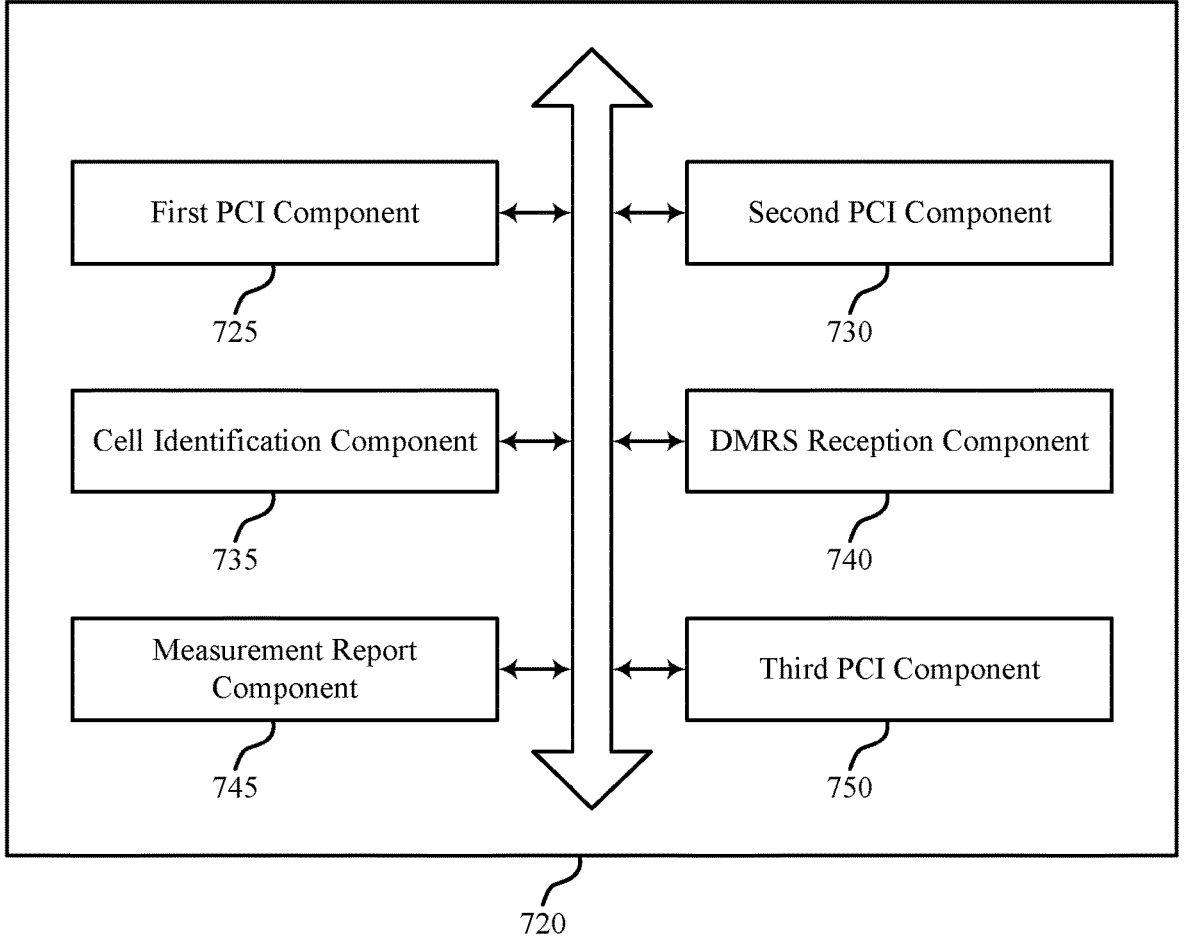
FIG. 7 shows a block diagram of a communications manager that supports techniques for mitigating PCI conflicts in accordance with one or more aspects of the present disclosure.

FIG. 7 shows a block diagram 700 of a communications manager 720 that supports techniques for mitigating PCI conflicts in accordance with one or more aspects of the present disclosure. The communications manager 720 may be an example of aspects of a communications manager 520, a communications manager 620, or both, as described herein. The communications manager 720, or various components thereof, may support techniques for mitigating PCI conflicts as described herein. For example, the communications manager 720 may include a first PCI component 725, a second PCI component 730, a cell identification component 735, a DMRS reception component 740, a measurement report component 745, a third PCI component 750, or any combination thereof. Each of these components, or components or subcomponents thereof (e.g., one or more processors, one or more memories), may communicate, directly or indirectly, with one another (e.g., via one or more buses).

The communications manager 720 may support techniques for wireless communication, in accordance with examples disclosed herein. The first PCI component 725 may be capable of, configured to, or operable to support a means for receiving, via a cell with a physical cell identity, a first set of one or more signals indicating a first PCI value of a PCI sequence and a code value associated with the PCI sequence for the cell. The second PCI component 730 may be capable of, configured to, or operable to support a means for receiving, via the cell with the physical cell identity, a second set of one or more signals indicating a second PCI value of the PCI sequence and the code value associated with the PCI sequence for the cell. The cell identification component 735 may be capable of, configured to, or operable to support a means for performing, via the cell with the physical cell identity, one or more wireless communications in association with determining the physical cell identity of the cell based on the first PCI value, the second PCI value, and the code value associated with the PCI sequence for the cell.

In some examples, the second PCI value is a function of the first PCI value and the code value associated with the PCI sequence for the cell. In some examples, the first PCI value is equivalent to the second PCI value.

In some examples, the function includes at least one of a constant function, a linear ramp function that iterates through all PCI values of a set of PCI values, a linear ramp function that iterates through a subset of the set of PCI values, or an alternating function.

In some examples, the cell identification component 735 may be capable of, configured to, or operable to support a means for determining the physical cell identity of the cell based on the PCI sequence including the first PCI value and the second PCI value, where the PCI sequence is based on the code value associated with the PCI sequence for the cell and a coefficient.

In some examples, to support receiving the first set of one or more signals, the first PCI component 725 may be capable of, configured to, or operable to support a means for receiving an PSS and an SSS that collectively indicate the first PCI value or the second PCI value. In some examples, to support receiving the first set of one or more signals, the first PCI component 725 may be capable of, configured to, or operable to support a means for receiving a MIB or an SIB that indicates the code value associated with the PCI sequence for the cell.

In some examples, a first value encoded by the PSS and a second value encoded by the SSS follow a sequence that depends on the code value associated with the PCI sequence for the cell.

In some examples, a first value encoded by the PSS is fixed and a second value of the SSS follows a sequence that depends on the code value associated with the PCI sequence for the cell. In some examples, the MIB is scrambled using the first PCI value or the second PCI value.

In some examples, the DMRS reception component 740 may be capable of, configured to, or operable to support a means for receiving at least one DMRS that is scrambled using the first PCI value, the second PCI value, the code value associated with the PCI sequence for the cell, or any combination thereof.

In some examples, the measurement report component 745 may be capable of, configured to, or operable to support a means for transmitting a report that includes one or more measurements of the first PCI value, the second PCI value, or both.

In some examples, the one or more measurements correspond to the PCI sequence associated with the physical cell identity of the cell. In some examples, the report further indicates timing information associated with the one or more measurements of the PCI values. In some examples, the report further indicates the code value associated with the PCI sequence for the cell.

In some examples, the third PCI component 750 may be capable of, configured to, or operable to support a means for receiving a third set of one or more signals indicating the first PCI value and a second code value. In some examples, the cell identification component 735 may be capable of, configured to, or operable to support a means for determining that the third set of one or more signals correspond to another cell based on the second code value being different from the code value associated with the PCI sequence for the cell.

Figure 8:
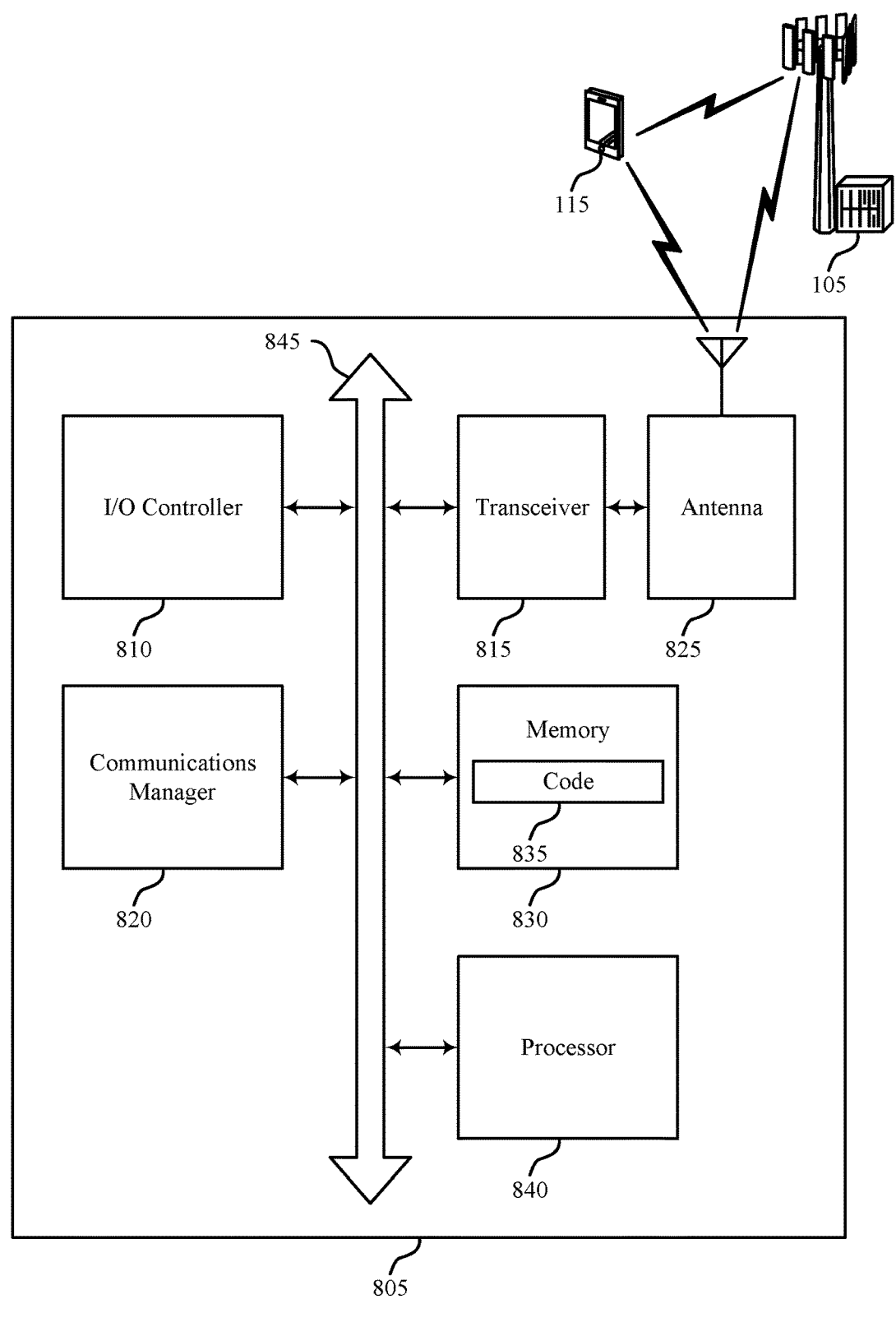
FIG. 8 shows a diagram of a system including a device that supports techniques for mitigating PCI conflicts in accordance with one or more aspects of the present disclosure.

FIG. 8 shows a diagram of a system 800 including a device 805 that supports techniques for mitigating PCI conflicts in accordance with one or more aspects of the present disclosure. The device 805 may be an example of or include the components of a device 505, a device 605, or a UE 115, as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS)

which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting techniques for mitigating PCI conflicts). For example, the device 805 or a component of the device 805 may include at least one processor 840 and at least one memory 830 coupled with or to the at least one processor 840, the at least one processor 840 and at least one memory 830 configured to perform various functions described herein.

In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs.

The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communication in accordance with examples disclosed herein. For example, the communications manager 820 may be capable of, configured to, or operable to support a means for receiving, via a cell with a physical cell identity, a first set of one or more signals indicating a first PCI value of a PCI sequence and a code value associated with the PCI sequence for the cell. The communications manager 820 may be capable of, configured to, or operable to support a means for receiving, via the cell with the physical cell identity, a second set of one or more signals indicating a second PCI value of the PCI sequence and the code value associated with the PCI sequence for the cell. The communications manager 820 may be capable of, configured to, or operable to support a means for performing, via the cell with the physical cell identity, one or more wireless communications in association with determining the physical cell identity of the cell based on the first PCI value, the second PCI value, and the code value associated with the PCI sequence for the cell.

By including or configuring the communications manager 820 in accordance with examples as described herein, the device 805 may support techniques for improved communication reliability, reduced latency, and improved user experience related to reduced processing, reduced power consumption, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the processor-executable code 835, or any combination thereof. For example, the code 835 may include instructions executable by the at least one processor 840 to cause the device 805 to perform various aspects of techniques for mitigating PCI conflicts as described herein, or the at least one processor 840 and the at least one memory 830 may be otherwise configured to, individually or collectively, perform or support such operations.

Figure 9:
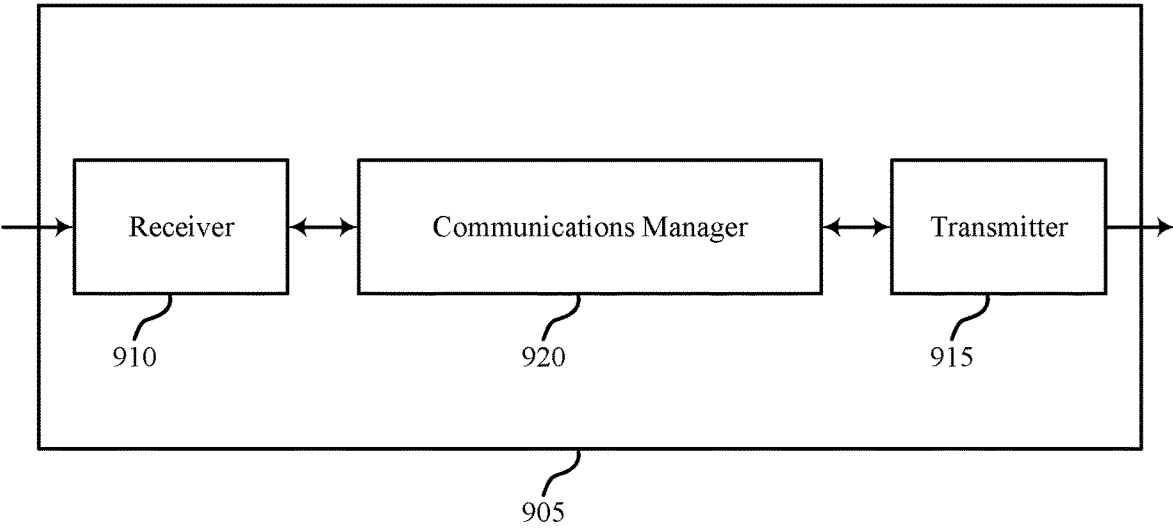
FIGS. 9 and 10 show block diagrams of devices that support techniques for mitigating PCI conflicts in accordance with one or more aspects of the present disclosure.

FIG. 9 shows a block diagram 900 of a device 905 that supports techniques for mitigating PCI conflicts in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations or components thereof, may support techniques for mitigating PCI conflicts as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may be capable of, configured to, or operable to support a means for transmitting, via a cell with a physical cell identity, a first set of one or more signals that indicate a first PCI value of a PCI sequence and a code value associated with the PCI sequence for the cell. The communications manager 920 may be capable of, configured to, or operable to support a means for transmitting, via the cell with the physical cell identity, a second set of one or more signals that indicate a second PCI value of the PCI sequence and the code value associated with the PCI sequence for the cell. The communications manager 920 may be capable of, configured to, or operable to support a means for performing one or more wireless communications via the cell with the physical cell identity, where the physical cell identity of the cell is based on the first PCI value, the second PCI value, and the code value associated with the PCI sequence for the cell.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing, lower signaling overhead, and reduced power consumption, among other benefits.

Figure 10:

FIG. 10 shows a block diagram 1000 of a device 1005 that supports techniques for mitigating PCI conflicts in accordance with one or more aspects of the present disclosure. The device 1005 may be an example of aspects of a device 905 or a network entity 105, as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may support techniques for mitigating PCI conflicts as described herein. For example, the communications manager 1020 may include a first signaling component 1025, a second signaling component 1030, a physical cell component 1035, or any combination thereof. The communications manager 1020 may be an example of aspects of a communications manager 920, as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support techniques for wireless communication, in accordance with examples disclosed herein. The first signaling component 1025 may be capable of, configured to, or operable to support a means for transmitting, via a cell with a physical cell identity, a first set of one or more signals that indicate a first PCI value of a PCI sequence and a code value associated with the PCI sequence for the cell. The second signaling component 1030 may be capable of, configured to, or operable to support a means for transmitting, via the cell with the physical cell identity, a second set of one or more signals that indicate a second PCI value of the PCI sequence and the code value associated with the PCI sequence for the cell. The physical cell component 1035 may be capable of, configured to, or operable to support a means for performing one or more wireless communications via the cell with the physical cell identity, where the physical cell identity of the cell is based on the first PCI value, the second PCI value, and the code value associated with the PCI sequence for the cell.

Figure 11:
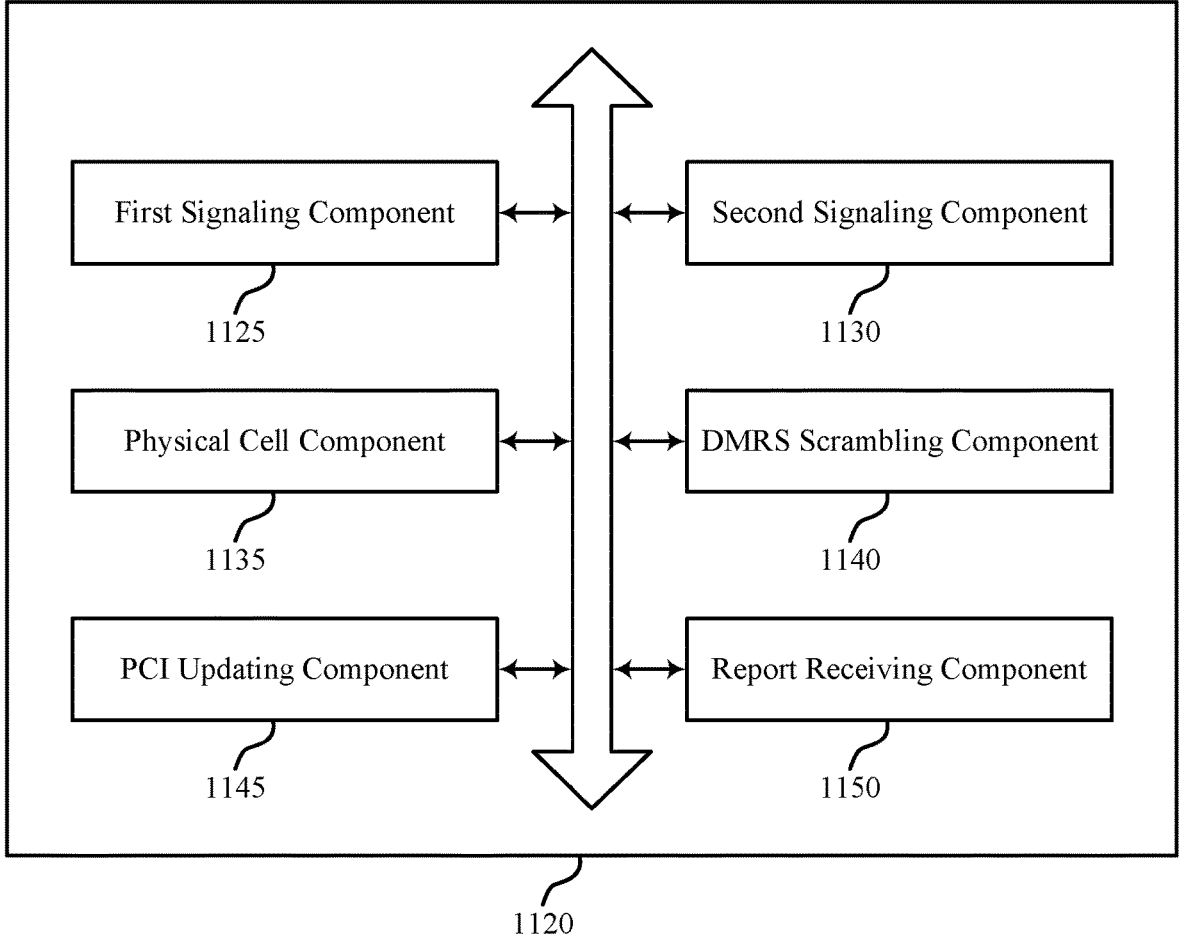
FIG. 11 shows a block diagram of a communications manager that supports techniques for mitigating PCI conflicts in accordance with one or more aspects of the present disclosure.

FIG. 11 shows a block diagram 1100 of a communications manager 1120 that supports techniques for mitigating PCI conflicts in accordance with one or more aspects of the present disclosure. The communications manager 1120 may be an example of aspects of a communications manager 920, a communications manager 1020, or both, as described herein. The communications manager 1120, or various components thereof, may support techniques for mitigating PCI conflicts. For example, the communications manager 1120 may include a first signaling component 1125, a second signaling component 1130, a physical cell component 1135, a DMRS scrambling component 1140, a PCI updating component 1145, a report receiving component 1150, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support techniques for wireless communication, in accordance with examples disclosed herein. The first signaling component 1125 may be capable of, configured to, or operable to support a means for transmitting, via a cell with a physical cell identity, a first set of one or more signals that indicate a first PCI value of a PCI sequence and a code value associated with the PCI sequence for the cell. The second signaling component 1130 may be capable of, configured to, or operable to support a means for transmitting, via the cell with the physical cell identity, a second set of one or more signals that indicate a second PCI value of the PCI sequence and the code value associated with the PCI sequence for the cell. The physical cell component 1135 may be capable of, configured to, or operable to support a means for performing one or more wireless communications via the cell with the physical cell identity, where the physical cell identity of the cell is based on the first PCI value, the second PCI value, and the code value associated with the PCI sequence for the cell.

In some examples, the second PCI value is a function of the first PCI value and the code value associated with the PCI sequence for the cell. In some examples, the first PCI value is equivalent to the second PCI value.

In some examples, the function includes at least one of a constant function, a linear ramp function that iterates through all PCI values of a set of PCI values, a linear ramp function that iterates through a subset of the set of PCI values, or an alternating function.

In some examples, the physical cell identity of the cell is based on the PCI sequence including the first PCI value and the second PCI value. In some examples, the PCI sequence is based on the code value associated with the PCI sequence for the cell and a coefficient.

In some examples, to support transmitting the first set of one or more signals, the first signaling component 1125 may be capable of, configured to, or operable to support a means for transmitting an PSS and an SSS that collectively indicate the first PCI value or the second PCI value. In some examples, to support transmitting the first set of one or more signals, the first signaling component 1125 may be capable of, configured to, or operable to support a means for transmitting a MIB or a SIB that indicates the code value associated with the PCI sequence for the cell.

In some examples, a first value encoded by the PSS and a second value encoded by the SSS follow a sequence that depends on the code value associated with the PCI sequence for the cell.

In some examples, a first value encoded by the PSS is fixed and a second value encoded by the SSS follows a sequence that depends on the code value associated with the PCI sequence for the cell. In some examples, the MIB is scrambled using the first PCI value or the second PCI value.

In some examples, the DMRS scrambling component 1140 may be capable of, configured to, or operable to support a means for scrambling at least one DMRS using the first PCI value, the second PCI value, the code value associated with the PCI sequence for the cell, or any combination thereof.

In some examples, the PCI updating component 1145 may be capable of, configured to, or operable to support a means for changing the first PCI value of the cell to the second PCI value after a quantity of SSB bursts.

In some examples, the report receiving component 1150 may be capable of, configured to, or operable to support a means for receiving a report that includes one or more measurements of the first PCI value, the second PCI value, or both. In some examples, the one or more measurements correspond to the PCI sequence associated with the physical cell identity of the cell.

Figure 12:
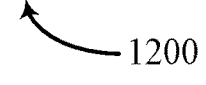
FIG. 12 shows a diagram of a system including a device that supports techniques for mitigating PCI conflicts in accordance with one or more aspects of the present disclosure.

FIG. 12 shows a diagram of a system 1200 including a device 1205 that supports techniques for mitigating PCI conflicts in accordance with one or more aspects of the present disclosure. The device 1205 may be an example of or include the components of a device 905, a device 1005, or a network entity 105, as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, processor-executable code 1230, and at least one processor 1235.

These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals.

In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof.

In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting techniques for mitigating PCI conflicts). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein.

The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs.

The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support techniques for wireless communication, in accordance with examples disclosed herein. For example, the communications manager 1220 may be capable of, configured to, or operable to support a means for transmitting, via a cell with a physical cell identity, a first set of one or more signals that indicate a first PCI value of a PCI sequence and a code value associated with the PCI sequence for the cell. The communications manager 1220 may be capable of, configured to, or operable to support a means for transmitting, via the cell with the physical cell identity, a second set of one or more signals that indicate a second PCI value of the PCI sequence and the code value associated with the PCI sequence for the cell. The communications manager 1220 may be capable of, configured to, or operable to support a means for performing one or more wireless communications via the cell with the physical cell identity, where the physical cell identity of the cell is based on the first PCI value, the second PCI value, and the code value associated with the PCI sequence for the cell.

By including or configuring the communications manager 1220 in accordance with examples as described herein, the device 1205 may support techniques for improved communication reliability, reduced latency, and improved user experience related to reduced processing, reduced power consumption, improved coordination between devices, longer battery life, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of techniques for mitigating PCI conflicts as described herein, or the at least one processor 1235 and the at least one memory 1225 may be otherwise configured to, individually or collectively, perform or support such operations.

FIG. 13 shows a flowchart illustrating a method 1300 for mitigating PCI conflicts in accordance with aspects of the present disclosure. The operations of the method 1300 may be implemented by a UE or components thereof. For example, the operations of the method 1300 may be performed by the UE 115-*a* shown and described with reference to FIGS. 2 through 4. In some examples, the UE may execute a set of instructions to control the functional elements of the UE to perform the described functions. Additionally, or alternatively, the UE may perform aspects of the described functions using special-purpose hardware.

At 1305, the method 1300 includes receiving, via a cell with a physical cell identity, a first set of one or more signals indicating a first PCI value of a PCI sequence and a first code value associated with the PCI sequence for the cell. In some examples, aspects of the operations of 1305 may be performed by a first PCI component 725, as described with reference to FIG. 7.

At 1310, the method 1300 includes receiving, via the cell with the physical cell identity, a second set of one or more signals indicating a second PCI value of the PCI sequence and a second code value associated with the PCI sequence for the cell. In some examples, aspects of the operations of 1310 may be performed by a second PCI component 730, as described with reference to FIG. 7.

At 1315, the method 1300 includes performing, via the cell with the physical cell identity, one or more wireless communications in association with determining the physical cell identity of the cell based at least in part on the first PCI value, the second PCI value, the first code value, and the second code value associated with the PCI sequence for the cell. In some examples, aspects of the operations of 1315 may be performed by a cell identification component 735, as described with reference to FIG. 7.

FIG. 14 shows a flowchart illustrating a method 1400 that supports techniques for mitigating PCI conflicts in accordance with aspects of the present disclosure. The operations of the method 1400 may be implemented by a network entity or components thereof. For example, the operations of the method 1400 may be performed by a network entity 105, as described with reference to FIGS. 1 through 4 and 9 through 12. In some examples, the network entity may execute a set of instructions to control the functional elements of the network entity to perform the described functions. Additionally, or alternatively, the network entity may perform aspects of the described functions using special-purpose hardware.

At 1405, the method 1400 includes transmitting, via a cell with a physical cell identity, a first set of one or more signals that indicate a first PCI value of a PCI sequence and a code value associated with the PCI sequence for the cell. In some examples, aspects of the operations of 1405 may be performed by a first signaling component 1125, as described with reference to FIG. 11.

At 1410, the method 1400 includes transmitting, via the cell with the physical cell identity, a second set of one or more signals that indicate a second PCI value of the PCI sequence and the code value associated with the PCI sequence for the cell. In some examples, aspects of the operations of 1410 may be performed by a second signaling component 1130, as described with reference to FIG. 11.

At 1415, the method 1400 includes performing one or more wireless communications via the cell with the physical cell identity, where the physical cell identity of the cell is based at least in part on the first PCI value, the second PCI value, and the code value associated with the PCI sequence for the cell. In some examples, aspects of the operations of 1415 may be performed by a physical cell component 1135, as described with reference to FIG. 11.

The following provides an overview of aspects of the present disclosure:

Aspect 1: A method for wireless communication by a UE, comprising: receiving, via a cell with a physical cell identity, a first set of one or more signals indicating a first PCI value of a PCI sequence and a first code value associated with the PCI sequence for the cell; receiving, via the cell with the physical cell identity, a second set of one or more signals indicating a second PCI value of the PCI sequence and a second code value associated with the PCI sequence for the cell; and performing, via the cell with the physical cell identity, one or more wireless communications in association with determining the physical cell identity of the cell based at least in part on the first PCI value, the second PCI value, the first code value, and the second code value associated with the PCI sequence for the cell.

Aspect 2: The method of aspect 1, wherein the second PCI value is a function of the first PCI value, the first code value, the second code value, or any combination thereof.

Aspect 3: The method of aspect 2, wherein the function comprises at least one of a constant function, a linear ramp function that iterates through all PCI values of a set of PCI values, a linear ramp function that iterates through a subset of the set of PCI values, or an alternating function.

Aspect 4: The method of any of aspects 1 through 3, wherein the first PCI value is equivalent to the second PCI value.

Aspect 5: The method of any of aspects 1 through 4, further comprising: determining the physical cell identity of the cell based at least in part on the PCI sequence comprising the first PCI value and the second PCI value, wherein the PCI sequence is based at least in part on a coefficient, the first code value, the second code value, or any combination thereof.

Aspect 6: The method of any of aspects 1 through 5, wherein receiving the first set of one or more signals comprises: receiving an PSS and an SSS that collectively indicate the first PCI value or the second PCI value; and receiving a MIB or SIB that indicates the first code value associated with the PCI sequence for the cell.

Aspect 7: The method of aspect 6, wherein a first value encoded by the PSS and a second value encoded by the SSS follow a sequence that depends on the first code value associated with the PCI sequence for the cell.

Aspect 8: The method of any of aspects 6 through 7, wherein a first value encoded by the PSS is fixed and a second value of the SSS follows a sequence that depends on the first code value associated with the PCI sequence for the cell.

Aspect 9: The method of any of aspects 6 through 8, wherein the MIB is scrambled using the first PCI value or the second PCI value.

Aspect 10: The method of any of aspects 1 through 9, further comprising: receiving at least one DMRS that is scrambled using the first PCI value, the second PCI value, the first code value, the second code value, or any combination thereof.

Aspect 11: The method of any of aspects 1 through 10, further comprising: transmitting a report that includes one or more measurements of the first PCI value, the second PCI value, or both.

Aspect 12: The method of aspect 11, wherein the one or more measurements correspond to the PCI sequence associated with the physical cell identity of the cell.

Aspect 13: The method of any of aspects 11 through 12, wherein the report further indicates timing information associated with the one or more measurements of the PCI values.

Aspect 14: The method of any of aspects 11 through 13, wherein the report further indicates the first code value or the second code value associated with the PCI sequence for the cell.

Aspect 15: The method of any of aspects 11 through 14, further comprising: receiving a third set of one or more signals indicating the first PCI value and a third code value; and determining that the third set of one or more signals correspond to another cell based at least in part on the third code value being different from the first code value or the second code value associated with the PCI sequence for the cell.

Aspect 16: A method for wireless communication by a network entity, comprising: transmitting, via a cell with a physical cell identity, a first set of one or more signals that indicate a first physical cell identifier (PCI) value of a PCI sequence and a first code value associated with the PCI sequence for the cell; transmitting, via the cell with the physical cell identity, a second set of one or more signals that indicate a second PCI value of the PCI sequence and a second code value associated with the PCI sequence for the cell; and performing one or more wireless communications via the cell with the physical cell identity, wherein the physical cell identity of the cell is based at least in part on the first PCI value, the second PCI value, the first code value, and the second code value associated with the PCI sequence for the cell.

Aspect 17: The method of aspect 16, wherein the second PCI value is a function of the first PCI value, the first code value, the second code value, or any combination thereof.

Aspect 18: The method of aspect 17, wherein the function comprises at least one of a constant function, a linear ramp function that iterates through all PCI values of a set of PCI values, a linear ramp function that iterates through a subset of the set of PCI values, or an alternating function.

Aspect 19: The method of any of aspects 16 through 18, wherein the first PCI value is equivalent to the second PCI value.

Aspect 20: The method of any of aspects 16 through 19, wherein the physical cell identity of the cell is based at least in part on the PCI sequence comprising the first PCI value and the second PCI value, and the PCI sequence is based at least in part on the code value associated with the PCI sequence for the cell and a coefficient.

Aspect 21: The method of any of aspects 16 through 20, wherein transmitting the first set of one or more signals comprises: transmitting an PSS and an SSS that collectively indicate the first PCI value or the second PCI value; and transmitting a MIB or a SIB that indicates the first code value associated with the PCI sequence for the cell.

Aspect 22: The method of aspect 21, wherein a first value encoded by the PSS and a second value encoded by the SSS follow a sequence that depends on the first code value associated with the PCI sequence for the cell.

Aspect 23: The method of any of aspects 21 through 22, wherein a first value encoded by the PSS is fixed and a second value encoded by the SSS follows a sequence that depends on the first code value associated with the PCI sequence for the cell.

Aspect 24: The method of any of aspects 21 through 23, wherein the MIB is scrambled using the first PCI value or the second PCI value.

Aspect 25: The method of any of aspects 16 through 24, further comprising: scrambling at least one DMRS using the first PCI value, the second PCI value, the first code value, the second code value, or any combination thereof.

Aspect 26: The method of any of aspects 16 through 25, further comprising: changing the first PCI value of the cell to the second PCI value after a quantity of synchronization signal block (SSB) bursts.

Aspect 27: The method of any of aspects 16 through 26, further comprising: receiving a report that includes one or more measurements of the first PCI value, the second PCI value, or both.

Aspect 28: The method of aspect 27, wherein the one or more measurements correspond to the PCI sequence associated with the physical cell identity of the cell.

Aspect 29: A UE, comprising: one or more memories storing processor-executable code; and one or more processors coupled with the one or more memories and individually or collectively operable to execute the code to cause the UE to perform a method of any of aspects 1 through 15.

Aspect 30: A UE, comprising: at least one means for performing a method of any of aspects 1 through 15.

Aspect 31: A non-transitory computer-readable medium storing code for wireless communication, the code comprising instructions executable by at least one processor to perform a method of any of aspects 1 through 15.

Aspect 32: A network entity, comprising: one or more memories storing processor-executable code; and one or more processors coupled with the one or more memories and individually or collectively operable to execute the code to cause the network entity to perform a method of any of aspects 16 through 28.

Aspect 33: A network entity, comprising: at least one means for performing a method of any of aspects 16 through 28.

Aspect 34: A non-transitory computer-readable medium storing code for wireless communication, the code comprising instructions executable by at least one processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively operable to execute the code to cause the UE to:
   receive, via a cell with a physical cell identity, a first set of one or more signals indicating a first physical cell identifier (PCI) value of a PCI sequence and a code value associated with the PCI sequence for the cell;
   receive, via the cell with the physical cell identity, a second set of one or more signals indicating a second PCI value of the PCI sequence and the code value associated with the PCI sequence for the cell; and
   perform, via the cell with the physical cell identity, one or more wireless communications in association with determining the physical cell identity of the cell based at least in part on the first PCI value, the second PCI value, and the code value associated with the PCI sequence for the cell.

2. The UE of claim 1, wherein the second PCI value is a function of the first PCI value and the code value associated with the PCI sequence for the cell.

3. The UE of claim 2, wherein the function comprises at least one of a constant function, a linear ramp function that iterates through all PCI values of a set of PCI values, a linear ramp function that iterates through a subset of the set of PCI values, or an alternating function.

4. The UE of claim 1, wherein the first PCI value is equivalent to the second PCI value.

5. The UE of claim 1, wherein the one or more processors are individually or collectively operable to execute the code to further cause the UE to:
   determine the physical cell identity of the cell based at least in part on the PCI sequence comprising the first PCI value and the second PCI value, wherein the PCI sequence is based at least in part on the code value associated with the PCI sequence for the cell and a coefficient.

6. The UE of claim 1, wherein to receive the first set of one or more signals, the one or more processors are individually or collectively operable to execute the code to cause the UE to:

receive a primary synchronization signal (PSS) and a secondary synchronization signal (SSS) that collectively indicate the first PCI value or the second PCI value; and receive a master information block (MIB) or a system information block (SIB) that indicates the code value associated with the PCI sequence for the cell.

7. The UE of claim 6, wherein a first value encoded by the PSS and a second value encoded by the SSS follow a sequence that depends on the code value associated with the PCI sequence for the cell.

8. The UE of claim 6, wherein a first value encoded by the PSS is fixed and a second value of the SSS follows a sequence that depends on the code value associated with the PCI sequence for the cell.

9. The UE of claim 6, wherein the MIB is scrambled using the first PCI value or the second PCI value.

10. The UE of claim 1, wherein the one or more processors are individually or collectively operable to execute the code to further cause the UE to:

receive at least one demodulation reference signal (DMRS) that is scrambled using the first PCI value, the second PCI value, the code value associated with the PCI sequence for the cell, or any combination thereof.

11. The UE of claim 1, wherein the one or more processors are individually or collectively operable to execute the code to further cause the UE to:

transmit a report that includes one or more measurements of the first PCI value, the second PCI value, or both.

12. The UE of claim 11, wherein the one or more measurements correspond to the PCI sequence associated with the physical cell identity of the cell.

13. The UE of claim 11, wherein the report further indicates timing information associated with the one or more measurements of the first PCI value or the second PCI value.

14. The UE of claim 11, wherein the report further indicates the code value associated with the PCI sequence for the cell.

15. The UE of claim 11, wherein the one or more processors are individually or collectively operable to execute the code to further cause the UE to:

receive a third set of one or more signals indicating the first PCI value and a second code value; and determine that the third set of one or more signals correspond to another cell based at least in part on the second code value being different from the code value associated with the PCI sequence for the cell.

16. A network entity, comprising:

one or more memories storing processor-executable code; and one or more processors coupled with the one or more memories and individually or collectively operable to execute the code to cause the network entity to:

transmit, via a cell with a physical cell identity, a first set of one or more signals that indicate a first physical cell identifier (PCI) value of a PCI sequence and a code value associated with the PCI sequence for the cell;

transmit, via the cell with the physical cell identity, a second set of one or more signals that indicate a second PCI value of the PCI sequence and the code value associated with the PCI sequence for the cell; and perform one or more wireless communications via the cell with the physical cell identity, wherein the physical cell identity of the cell is based at least in part on the first PCI value, the second PCI value, and the code value associated with the PCI sequence for the cell.

17. The network entity of claim 16, wherein the second PCI value is a function of the first PCI value and the code value associated with the PCI sequence for the cell.

18. The network entity of claim 17, wherein the function comprises at least one of a constant function, a linear ramp function that iterates through all PCI values of a set of PCI values, a linear ramp function that iterates through a subset of the set of PCI values, or an alternating function.

19. The network entity of claim 16, wherein the first PCI value is equivalent to the second PCI value.

20. The network entity of claim 16, wherein:

the physical cell identity of the cell is based at least in part on the PCI sequence comprising the first PCI value and the second PCI value, and the PCI sequence is based at least in part on the code value associated with the PCI sequence for the cell and a coefficient.

21. The network entity of claim 16, wherein to transmit the first set of one or more signals, the one or more processors are individually or collectively operable to execute the code to cause the network entity to:

transmit a primary synchronization signal (PSS) and a secondary synchronization signal (SSS) that collectively indicate the first PCI value or the second PCI value; and transmit a master information block (MIB) or a system information block (SIB) that indicates the code value associated with the PCI sequence for the cell.

22. The network entity of claim 21, wherein a first value encoded by the PSS and a second value encoded by the SSS follow a sequence that depends on the code value associated with the PCI sequence for the cell.

23. The network entity of claim 21, wherein a first value encoded by the PSS is fixed and a second value encoded by the SSS follows a sequence that depends on the code value associated with the PCI sequence for the cell.

24. The network entity of claim 21, wherein the MIB is scrambled using the first PCI value or the second PCI value.

25. The network entity of claim 16, wherein the one or more processors are individually or collectively operable to execute the code to further cause the network entity to:

scramble at least one demodulation reference signal (DMRS) using the first PCI value, the second PCI value, the code value associated with the PCI sequence for the cell, or any combination thereof.

26. The network entity of claim 16, wherein the one or more processors are individually or collectively operable to execute the code to further cause the network entity to:

change the first PCI value of the cell to the second PCI value after a quantity of synchronization signal block (SSB) bursts.

27. The network entity of claim 16, wherein the one or more processors are individually or collectively operable to execute the code to further cause the network entity to:

receive a report that includes one or more measurements of the first PCI value, the second PCI value, or both.

28. The network entity of claim 27, wherein the one or more measurements correspond to the PCI sequence associated with the physical cell identity of the cell.

29. A method for wireless communication by a user equipment (UE), comprising:

receiving, via a cell with a physical cell identity, a first set of one or more signals indicating a first physical cell identifier (PCI) value of a PCI sequence and a code value associated with the PCI sequence for the cell;

receiving, via the cell with the physical cell identity, a second set of one or more signals indicating a second PCI value of the PCI sequence and the code value associated with the PCI sequence for the cell; and performing, via the cell with the physical cell identity, one or more wireless communications in association with determining the physical cell identity of the cell based at least in part on the first PCI value, the second PCI value, and the code value associated with the PCI sequence for the cell.

30. A method for wireless communication by a network entity, comprising:

transmitting, via a cell with a physical cell identity, a first set of one or more signals that indicate a first physical cell identifier (PCI) value of a PCI sequence and a code value associated with the PCI sequence for the cell;

transmitting, via the cell with the physical cell identity, a second set of one or more signals that indicate a second PCI value of the PCI sequence and the code value associated with the PCI sequence for the cell; and performing one or more wireless communications via the cell with the physical cell identity, wherein the physical cell identity of the cell is based at least in part on the first PCI value, the second PCI value, and the code value associated with the PCI sequence for the cell.

* * * * *